United States Patent [19]
Welch

[11] Patent Number: 5,493,112
[45] Date of Patent: Feb. 20, 1996

[54] METHOD AND APPARATUS FOR DETECTING THE PRESENCE AND LOCATION OF AN OBJECT IN A FIELD

[75] Inventor: David F. Welch, Menlo Park, Calif.

[73] Assignee: LaserScore, Inc., Willow Grove, Pa.

[21] Appl. No.: 487,409

[22] Filed: Jun. 7, 1995

Related U.S. Application Data

[63] Continuation of Ser. No. 117,283, Sep. 7, 1993, abandoned.

[51] Int. Cl.⁶ .................................................. H01J 40/14
[52] U.S. Cl. ..................... 250/221; 250/222.1; 356/387
[58] Field of Search ............................... 250/221, 222.1, 250/560, 561, 559.4, 559.12; 340/555, 556, 557; 359/214, 215, 220, 221; 356/387

[56] References Cited

U.S. PATENT DOCUMENTS

| | | |
|---|---|---|
| 2,165,147 | 7/1939 | Moss . |
| 2,506,475 | 5/1950 | Traub . |
| 2,523,773 | 9/1950 | Metzger . |
| 2,769,374 | 11/1956 | Sick .............................................. 88/74 |
| 3,047,723 | 7/1962 | Knapp ....................................... 250/222 |
| 3,235,738 | 2/1966 | Kress et al. . |
| 3,360,654 | 12/1967 | Harro Muller . |
| 3,401,937 | 9/1968 | Rockwood et al. . |
| 3,454,276 | 7/1969 | Brenkert et al. . |
| 3,487,226 | 12/1969 | Yetter et al. ............................. 250/222 |
| 3,550,941 | 12/1970 | Spiro et al. . |
| 3,590,225 | 6/1971 | Murphy ............................... 235/92 GA |
| 3,619,630 | 11/1971 | McLeod et al. ......................... 250/222 |
| 3,623,065 | 11/1971 | Rockwood et al. .................... 340/323 |
| 3,727,069 | 4/1973 | Crittenden, Jr. et al. ............ 250/222 R |
| 3,788,748 | 1/1974 | Knight et al. ............................ 356/141 |
| 3,790,173 | 2/1974 | Callaway . |
| 3,807,858 | 4/1974 | Finch ........................................ 356/1 |
| 3,809,891 | 7/1974 | Erdman et al. . |
| 3,836,148 | 9/1974 | Manning . |
| 3,972,531 | 8/1976 | Knapp . |
| 4,053,233 | 10/1977 | Bien et al. ............................... 356/141 |
| 4,057,251 | 11/1977 | Jones et al. ............................. 273/95 R |
| 4,097,800 | 6/1978 | Kuchmas, Jr. et al. ................ 324/178 |
| 4,127,771 | 11/1978 | Sick ........................................ 250/221 |
| 4,333,657 | 6/1982 | Jaworski et al. . |
| 4,402,609 | 9/1983 | Fetzer et al. ............................ 356/387 |
| 4,415,162 | 11/1983 | Sheppard ................................ 273/371 |
| 4,516,781 | 5/1985 | DeVale et al. . |
| 4,523,761 | 6/1985 | Huscher .................................. 273/371 |
| 4,561,660 | 12/1985 | Zammuto . |
| 4,561,778 | 12/1985 | Kleinhuber ............................. 356/387 |
| 4,586,716 | 5/1986 | Brejcha et al. . |
| 4,651,998 | 3/1987 | Holt et al. . |
| 4,706,962 | 11/1987 | Michalski . |
| 4,762,990 | 8/1988 | Caswell et al. ........................ 250/221 |
| 4,763,903 | 8/1988 | Goodwin et al. ...................... 273/371 |
| 4,768,789 | 9/1988 | Clark ....................................... 273/371 |
| 4,789,932 | 12/1988 | Cutler et al. ............................ 364/411 |
| 4,793,618 | 12/1988 | Tillery et al. . |
| 4,803,371 | 2/1989 | Durland . |
| 4,804,193 | 2/1989 | Lin et al. . |
| 4,824,121 | 4/1989 | Beall et al. . |
| 4,837,430 | 6/1989 | Hasegawa ............................... 250/221 |
| 4,855,608 | 8/1989 | Peterson, II ........................... 250/560 |
| 4,864,121 | 9/1989 | Pietzch .................................. 250/221 |

(List continued on next page.)

FOREIGN PATENT DOCUMENTS

| | | |
|---|---|---|
| 2160927 | 7/1973 | France . |
| 2630222 | 4/1988 | France . |
| 1449050 | 9/1976 | United Kingdom . |
| 2159269 | 11/1985 | United Kingdom . |

*Primary Examiner*—Edward P. Westin
*Assistant Examiner*—Steven L. Nichols
*Attorney, Agent, or Firm*—M. R. McGurk

[57] ABSTRACT

An optical system and method for detecting the presence and location of at least one stationary or moving object in a field. The optical system has at least one light source to generate a beam, which beam is scanned by at least one first reflecting surface to generate a plurality of beams. The beams are overlapped across the field by at least one second reflecting surface and their intensity is measured by at least one detection means.

18 Claims, 5 Drawing Sheets

U.S. PATENT DOCUMENTS

| | | | |
|---|---|---|---|
| 4,890,053 | 12/1989 | Banyasz et al. | |
| 4,893,822 | 1/1990 | Tesa et al. | |
| 4,949,972 | 8/1990 | Goodwin et al. | 273/371 |
| 4,955,967 | 11/1990 | Houriet, Jr. et al. | |
| 4,974,857 | 12/1990 | Beall et al. | 273/371 |
| 4,980,547 | 12/1990 | Griffin | 250/221 |
| 4,986,662 | 1/1991 | Bures | |
| 5,008,530 | 4/1991 | Ball | 250/221 |
| 5,020,806 | 6/1991 | Martin | 273/371 |
| 5,114,155 | 5/1992 | Tillery et al. | 273/371 |
| 5,156,643 | 10/1992 | Grubek | |
| 5,280,171 | 1/1994 | Halter | |
| 5,384,717 | 1/1995 | Ebenstein | |

METHOD AND APPARATUS FOR DETECTING THE PRESENCE AND LOCATION OF AN OBJECT IN A FIELD

This application is a continuation of application Ser. No. 08/117,283, filed Sep. 7, 1993, now abandoned.

BACKGROUND OF THE INVENTION

1. Technical Field

The invention relates to the use of scanned light beams to detect the presence and location of an object(s), stationary or otherwise, in a defined field. Once the object's presence and location are determined, the coordinate data generated may, for example, be correlated to a numerical value and displayed. Alternatively, if the object is a pen-like object, an image may be drawn on a corresponding display screen by moving the object through the field.

2. Description of the Related Art

The use of light beams to detect the presence and location of moving or stationary objects in a field is well documented. For example, U.S. Pat. Nos. 3,807,858 and 4,097,800 disclose the use of light beams for detecting the passage of a projectile through a field. French Patent No. 2,630,222 discloses the use of a plurality of light beams reflected off a rotating mirror to scan a monitored area and detect the presence of a fast moving object through the field.

U.S. Pat. No. 4,762,990 discloses an integrated light timing and rotational arc displacement system to establish the coordinates of the location of an object in a work area by the angular displacement of a single scanning light beam from a starting position until the beam is interrupted by the separate serially occurring events of intersection of a virtual image beam and the actual beam. The invention employs a directly reflecting peripheral member, opposite to the location of the scanning light beam. A retroreflecting light enhancing peripheral member may be employed on portions of the remaining periphery to detect a variety of styli or omitted to detect a retroreflecting stylus. The prior art, however, fails to overcome many problems associated with accurately detecting the presence and location of an object in a field and does not provide a simple and economical design.

For example, the system disclosed in U.S. Pat. No. 4,762,990 is overly complex and inaccurate. Actual and virtual beams are swept across the field and the beams are at all times diverging. This is problematic when detecting the presence of multiple objects in the field because shadows from other objects in the field are created by the diverging beams, which results in inaccurate readings. Even the presence of small objects in the field of such a system can create large shadows, which in turn cause serious inaccuracies in the position readings.

In addition, U.S. Pat. No. 4,762,990 contemplates the use of a retroreflector on the periphery of the field to maintain the background light level. Since the light beam is swept across the field, the angle of incidence of the light beam upon the retroreflector is constantly changing. The varying angle of incidence on the retroreflector results in a variable reflective efficiency and therefore the reflective response is not constant with time. This variance negatively affects the overall retroreflective efficiency and hence the accuracy of the system.

An additional problem associated with a system such as that disclosed in U.S. Pat. No. 4,762,990 is the effect of the corner on the illumination of the field. The reflective corner results in a region across the field which cannot be illuminated and therefore will result in a null in the signal. Consequently, there exists a region in which the system cannot measure objects accurately.

In addition to the above problems, scanning systems such as those described in U.S. Pat. No. 4,762,990 require the means of reflection to be intimate with and adjacent to the field being scanned. Specifically, the system illustrated in U.S. Pat. No. 4,762,990 does not permit the means of reflection to be remote from the field being scanned. Thus, design and aesthetic considerations are limited by the requirement that the reflective optics be intimate with and adjacent to the defined field.

SUMMARY OF THE INVENTION

Accordingly, the present invention is directed to an optical system for detecting the presence and location of at least one stationary or moving object in a field that obviates one or more of the problems of the related art.

The objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, there is disclosed an optical system for detecting the presence and location of at least one object in a field, having at least one light source to generate a beam, at least one first reflecting surface to generate a plurality of beams, at least one second reflecting surface to cause the beams to overlap the field, and at least one detection means for detecting the intensity of the beams.

In another aspect of the invention, there is disclosed an optical system for detecting the presence and location of at least one object in a field, having a light source to generate a beam, a first reflecting surface to generate a plurality of beams, second reflecting surfaces to cause the beams to overlap the field, and a detection means for detecting the intensity of the beams.

In yet another aspect of the invention, there is disclosed a method for detecting the presence and location of at least one object in a field, requiring the steps of generating at least one beam, reflecting the beam to generate a plurality of beams with at least one first reflective surface, causing at least a portion of the beams to overlap the field with at least one second reflective surface, and measuring the intensity of the beams after they overlap the field with at least one detection means.

It is to be understood that both the foregoing general description and the following detailed description are exemplary and explanatory and are intended to provide further explanation of the invention as claimed. The accompanying drawings are included to provide a further understanding of the invention and are incorporated in and constitute a part of this specification, illustrate several embodiments of the invention and together with the description serve to explain the principles of the invention.

DESCRIPTION OF THE PREFERRED EMBODIMENTS

Figure 1:
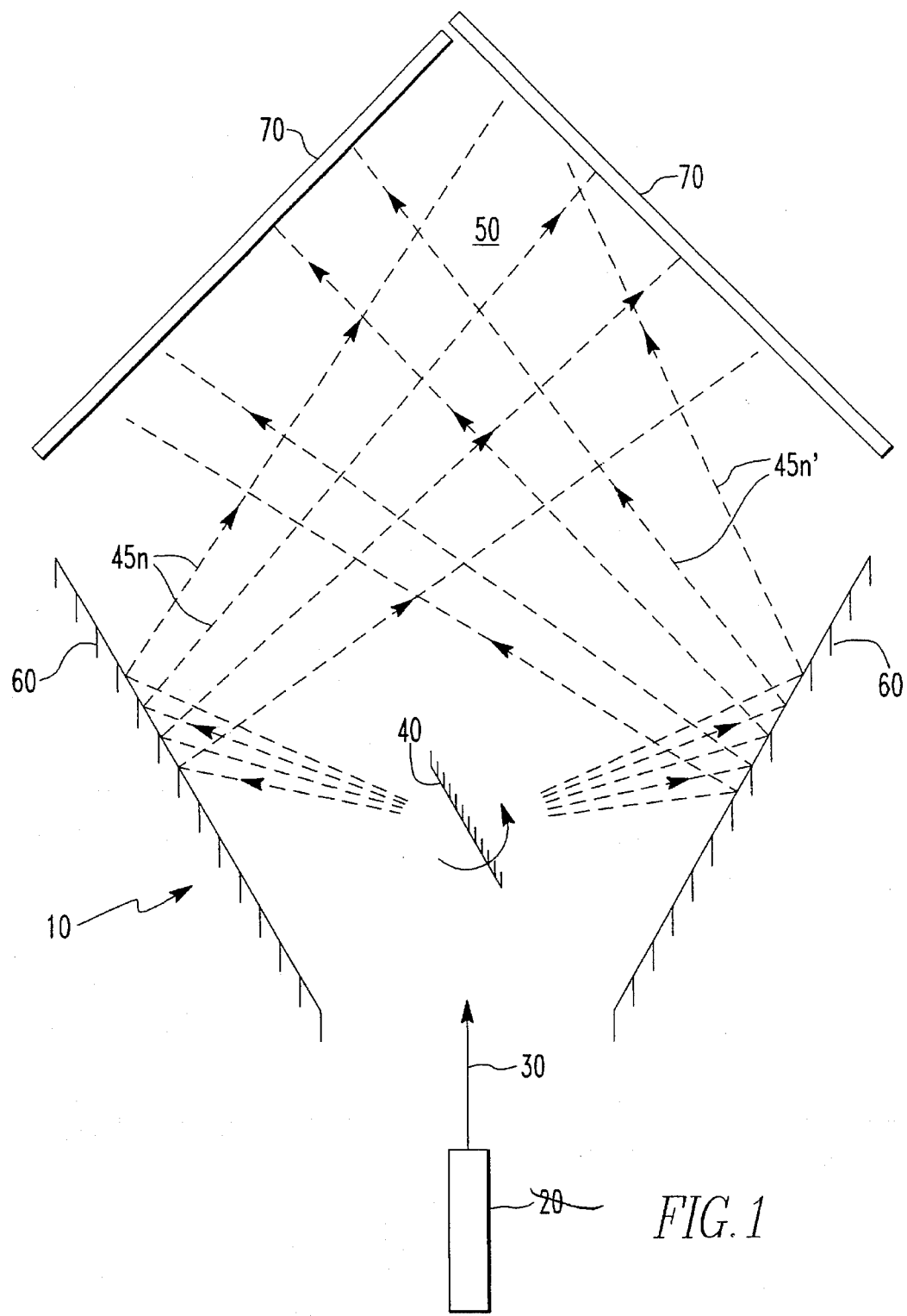
FIG. 1. is a schematic drawing of one aspect of the invention.

Reference will now be made in detail to the present preferred embodiments of the invention, examples of which are illustrated in the accompanying drawings. An exemplary embodiment of the optical system of the present invention is shown in FIG. 1 and is designated generally by reference numeral 10.

Referring to FIG. 1, and as embodied herein, there is provided an optical system 10 comprising a collimated light source 20 which generates a single collimated light beam 30. Collimated light beam 30 is reflected by a first reflective surface 40, resulting in scanned beams 45n and 45n'. Scanned beams 45n, n' are then reflected in the direction of field 50 by second reflective surfaces 60 positioned such that at least a portion of the scanned beams overlap field 50.

Scanned beams 45n, n', after crossing field 50 are detected by detection means 70. Detection means 70 senses a change in the intensity of the beams if an object (hereinafter, the term "object" refers to "object" or "objects") is present in the field or moves through the field and the data from the detection means is subsequently analyzed using, for example, a standard geometric transformation and correlated to give the object's location in the field and/or a numerical value based on that location.

In accordance with the embodiment of FIG. 1, collimated light beam 30 is generated by collimated light source 20. Collimated light source 20 is preferably a commercially available collimated laser diode having enough power output to be detectable, and preferably between 100 uW (microWatts) and 3 mW (milliWatts). Operating above 3 mW generally raises safety concerns, while operating below 100 uW can cause the signal to noise ratio (hereinafter "signal to noise") to become insufficient to obtain accurate readings.

The collimated laser diode generates a single, collimated beam preferably having a wavelength between 630 nm and 920 nm and a beam diameter of approximately 1 mm. A collimated laser diode emitting a beam having a wavelength of approximately 780 nm is especially preferred for the present invention because it is inexpensive and readily available commercially. (Available as Item No. 3ANS2 from MWK Industries (1993)). At wavelengths greater than 920 nm the detection sensitivity of the optical system of the present invention degrades and the signal to noise decreases. Collimated laser diodes operating at wavelengths below 630 nm are not presently available.

The intensity noise level of the collimated laser diode should be less than 10%. Greater than 10% noise causes the signal to noise to degrade and become unsatisfactory for proper detection.

In accordance with the present invention, other light sources may be used as long as the beam exiting the source is collimated. For example, the helium neon collimated laser is a suitable source for a collimated beam. Alternatively, white light sources such as filaments or arc lamps can also be used to generate a collimated beam. An alternative, collimated light source must have enough power to be detected. Further, the beam width or diameter characterizes the resolution and therefore the accuracy of the system.

In the embodiment of FIG. 1, and in accordance with the present invention, there is disclosed a first reflective surface 40 which sweeps the beam 30 through nearly a 360° arc, resulting in scanned beams 45n, n'. Scanned beams 45n, n' are then reflected by at least one and preferably two second reflective surfaces 60.

First reflective surface 40 preferably is a rotating mirror whose surface corresponds to the surface of the field being scanned. For example, an appropriately curved mirror surface is used to scan a conical field surface, whereas a planar mirror surface is used to scan a planar field surface. Thus, scanned beams 45n, n' are differentiated by time and scan speed of the rotating mirror.

The maximum rate of spin of the rotating mirror is a function of the speed of the detection means employed and the desired resolution and accuracy of the system. Typical detection means have speeds exceeding 25 nanoseconds. The minimum speed of the system and hence the scan rate of the rotating mirror is a function of the frequency of events in the field being scanned. The lower the rpm the longer each measurement will take. Practical considerations will require that an optimum rpm be chosen for each specific application. For the embodiment of the present invention shown in FIG. 5 and described below, the rotating mirror preferably spins at approximately 1800 rpm.

The beam sweep speed (1/rpm) during each complete sweep should be constant to within ±1% of a predetermined functional speed. For example, for a constant speed rotation of the mirror, the speed of each sweep must be constant within ±1%. For a ramped speed function, the sweep speed must be within ±1% of the predetermined ramped speed. A change in sweep speed greater than 1% causes a loss in resolution of the signal and consequent loss in accuracy in determining the position of the object in the field.

The reflectivity of the first reflective surface 40 must be such that the signal to noise is adequate to permit an accurate reading of the object's position in the field being scanned. Moreover, the first reflective surface must be positioned such that the beam plane and the plane of the field being scanned have coinciding profiles.

Further, for most commercial applications, the scanning beams should be approximately 1–5 mm and preferably 1–2 mm above the surface of the field being scanned to accurately detect the object's position in the field. At a greater distance above the field surface, the position of an object, which may tilt relative to the surface of the field being scanned, may be determined inaccurately because its true position in the field (i.e., where the object touches the surface of the field) has not been detected.

Alternative means for sweeping light beam 30 include, for example, a prism coupling optical element, holographic gratings, or polarization beam splitters. It should be recognized, however, that use of any one of these alternatives will require slight modifications to the optics of the present invention hereinbelow set forth.

In accordance with the embodiment shown in FIG. 1, at least one and preferably two commercially available mirrors constitute second reflective surfaces 60 and are used to reflect scanned beams 45n, n' so that they overlap field 50. More particularly, the mirror preferably is a flat, reflective mirror whose size determines the size of field 50. In other words, the mirror(s) should be adequately sized to cause scanned beams 45n, n' to overlap the entire field being scanned.

After scanned beams 45n, n' overlap field 50, they are detected by at least one and preferably two detection means 70 located on a side of field 50 opposite second reflective surfaces 60. As explained further below, detection means 70 sense an increase or decrease in the intensity of scanned beams 45n, n' when an object is present in field 50, and are used to provide coordinate information concerning the object's location.

Figure 2:
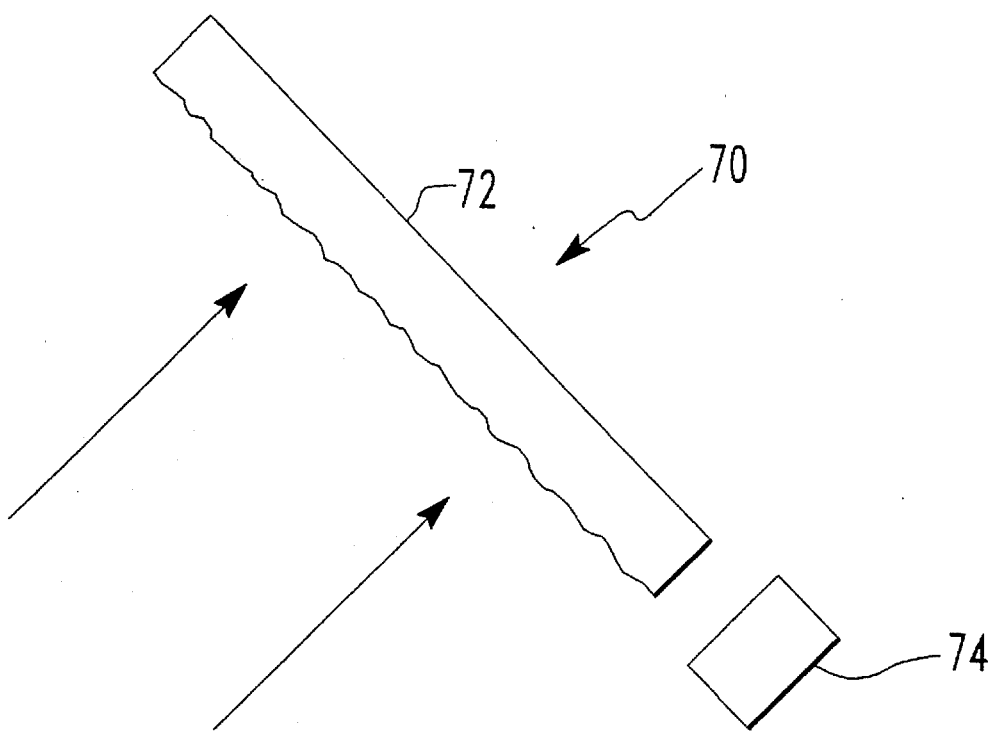
FIG. 2. is a schematic drawing of a detection means according to the invention.

Detection means 70 may be a detector having a surface area which is commensurate with the scanned field 50, to directly detect the intensity of scanned beams 45n, n' as shown in FIG. 1. In FIG. 1, two detectors are shown, although one or more than two may be used. More preferably, as shown in FIG. 2, detection means 70 comprises a passive optical element 72 which collects and guides the light to a detector 74. As was the case above, the passive optical element 72 has a surface area which is commensurate with the scanned field 50.

The passive optical element 72 may be a diffuse optical plate which both scatters and guides the light into detector 74. The granularity of the diffuse surface must be less than the resolution of the system without degrading the resolution of the system. The benefit of using the passive optical element is in the use of a less expensive small area detector.

Thus, detector 74 may be a small area silicon photo diode, such as that produced by Thorlabs, Inc., Model No. PDA-50, having a band width of 10 MHz and an active surface area of 5 mm$^2$.

A first detection means 70 senses a change in beam intensity when an object blocks the path of the beam, which change is correlated with the position of the rotating mirror, resulting in the determination of one coordinate. As explained above, the data from the detection means is analyzed using, for example, a standard geometric transformation and correlated to give the object's location in the field and/or a numerical value based on that location. A second detection means 70 may be provided to give a second coordinate of an object in field 50. During typical operation, the beam intensity decreases when an object blocks the path of the beams. Thus, detection means 70 senses a decrease in the beam intensity.

Figure 3:
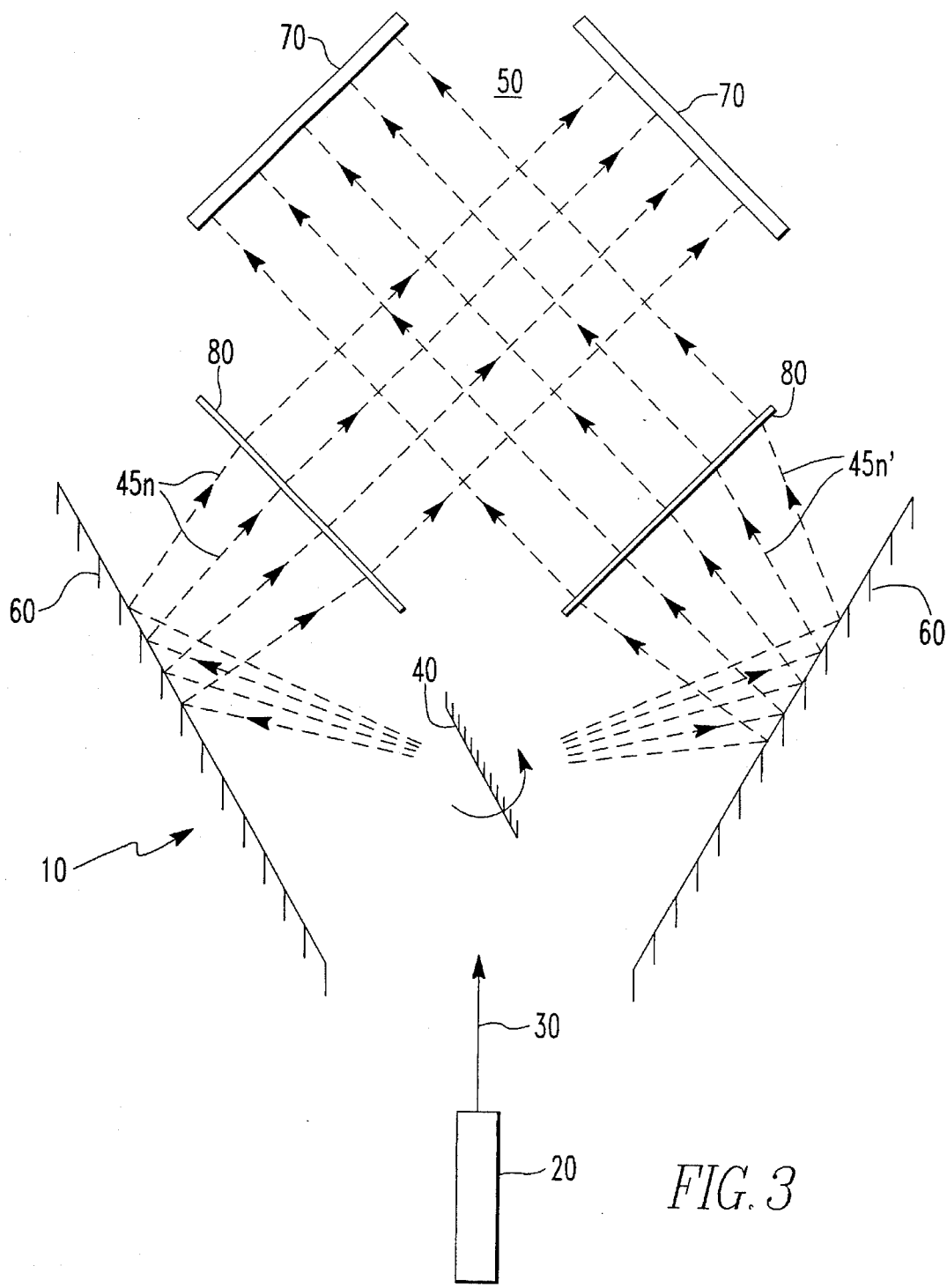
FIG. 3. is a schematic drawing of another aspect of the invention.

With reference to FIG. 3, a second embodiment of the invention will now be described. Like or similar parts or elements are identified throughout the figures by the same reference numerals.

Collimated light source 20 is used to generate collimated beam 30. Collimated beam is reflected by first reflective surface 40, resulting in scanned beams 45n, n'. Scanned beams 45n, n' are reflected by at least one and preferably two second reflective surfaces 60 to overlap field 50. Prior to overlapping field 50, however, scanned beams 45n, n' are imaged by at least one and preferably two lenses 80. Lens 80 is positioned so that it causes at least scanned beams 45n to propagate parallel to one another as they overlap field 50 and, where two lenses are used, scanned beams 45n' to propagate parallel to one another as they overlap field 50. As shown in FIG. 3, lenses 80 cause a set of collimated scanned beams to cross the field 50.

In a preferred embodiment of the invention of FIG. 3, lens 80 is a positive Fresnel lens, designed and positioned so that the first reflective surface 40 is located at the lens' focal point, thereby causing the scanned beams to be collimated upon exiting the lens. The dimensions of lens 80 are such that the width of lens 80 is commensurate with the width of field 50.

The Fresnel lens can be either spherical or cylindrical, depending upon the contour of the field to be scanned. For example, a spherical Fresnel lens used in conjunction with a planar rotating mirror will permit scanning of a planar surface. An example of a spherical Fresnel lens that may be used in the present invention is a 3M Fresnel lens, Model No. 78-8064-1645-5.

Alternatively, lens 80 may be positioned so that the scanned beams are either converging or diverging as they propagate across field 50. The selection of whether to use collimated, converging or diverging beams to scan the field is dependent, inter alia, on the number of objects being detected in the field as well as the desired accuracy of the system.

For example, collimated beams are preferred for detecting and locating multiple objects in a field because the effect of shadows is minimized and a rectangular coordinate system can be maintained as described further below. A converging beam system, on the other hand, can also be used to limit the shadowing effect but limits the size of the field being scanned. A diverging beam system is advantageous for simplicity of design but is limited primarily to single object detection systems.

After the beams overlap the field, they are detected in the same manner described above and illustrated in FIGS. 1 and 2 to provide coordinates of the object in the field.

Figure 4:
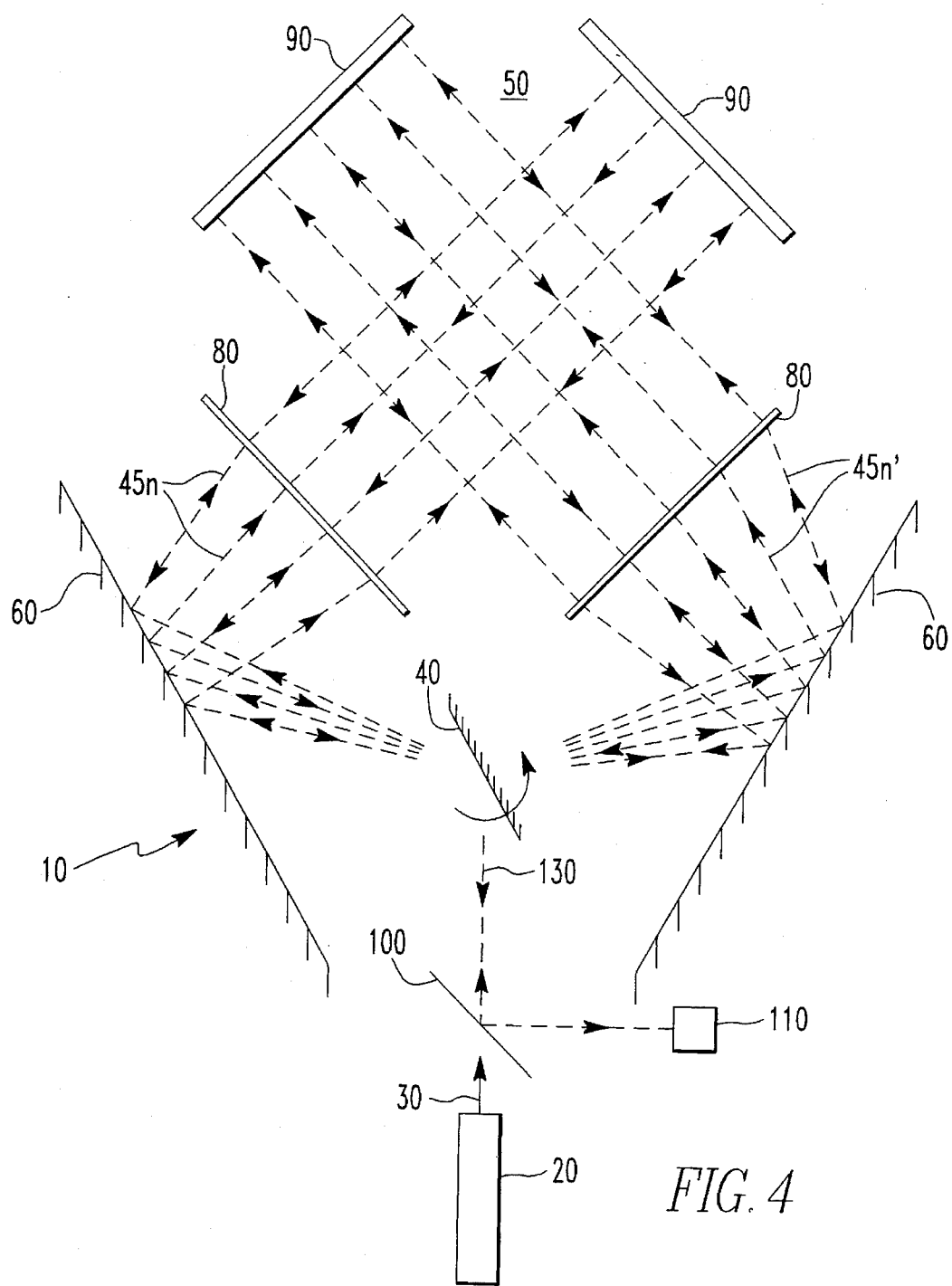
FIG. 4. is a schematic drawing of another aspect of the invention.

FIG. 4 illustrates yet another embodiment of the present invention. In FIG. 4, instead of detection means 70 positioned opposite a second reflective surface 60, at least one and preferably two retroreflective surfaces 90 are used which reflect the beams back along their original paths. The retroreflected beams subsequently converge on beam splitter 100 as beam 130, a portion of which is reflected by beam splitter 100 onto detection means 110.

In accordance with the invention, retroreflective surface 90 is comprised of an array of corner cubes, the granularity of which must be smaller than the resolution of the system. An example of a retroreflector useful in the present invention is retroreflective tape from Reflexite Corp., preferably having a granularity of less than 1 millimeter.

Beam splitter 100 may comprise a partially reflecting surface, such as a piece of glass, capable of both partially transmitting the output signal, i.e., beam 30, and partially reflecting the returning signal, i.e., beam 130, onto detection means 110. Beam splitter 100 is preferably a 50% transmittive/reflective beam splitter purchased from Edmund Scientific.

Detection means 110 is preferably a small area silicon photo diode such as the Model No. PDA 50 detector supplied by Thorlabs, Inc. described above and illustrated in FIG. 2 as detector 74. In this embodiment, however, a passive optical light guide 72 is not required because a single beam is being directed onto detection means 110 as shown in FIG. 4. In the FIG. 4 embodiment, an object's presence and location are determined in the same manner as above.

Figure 5:
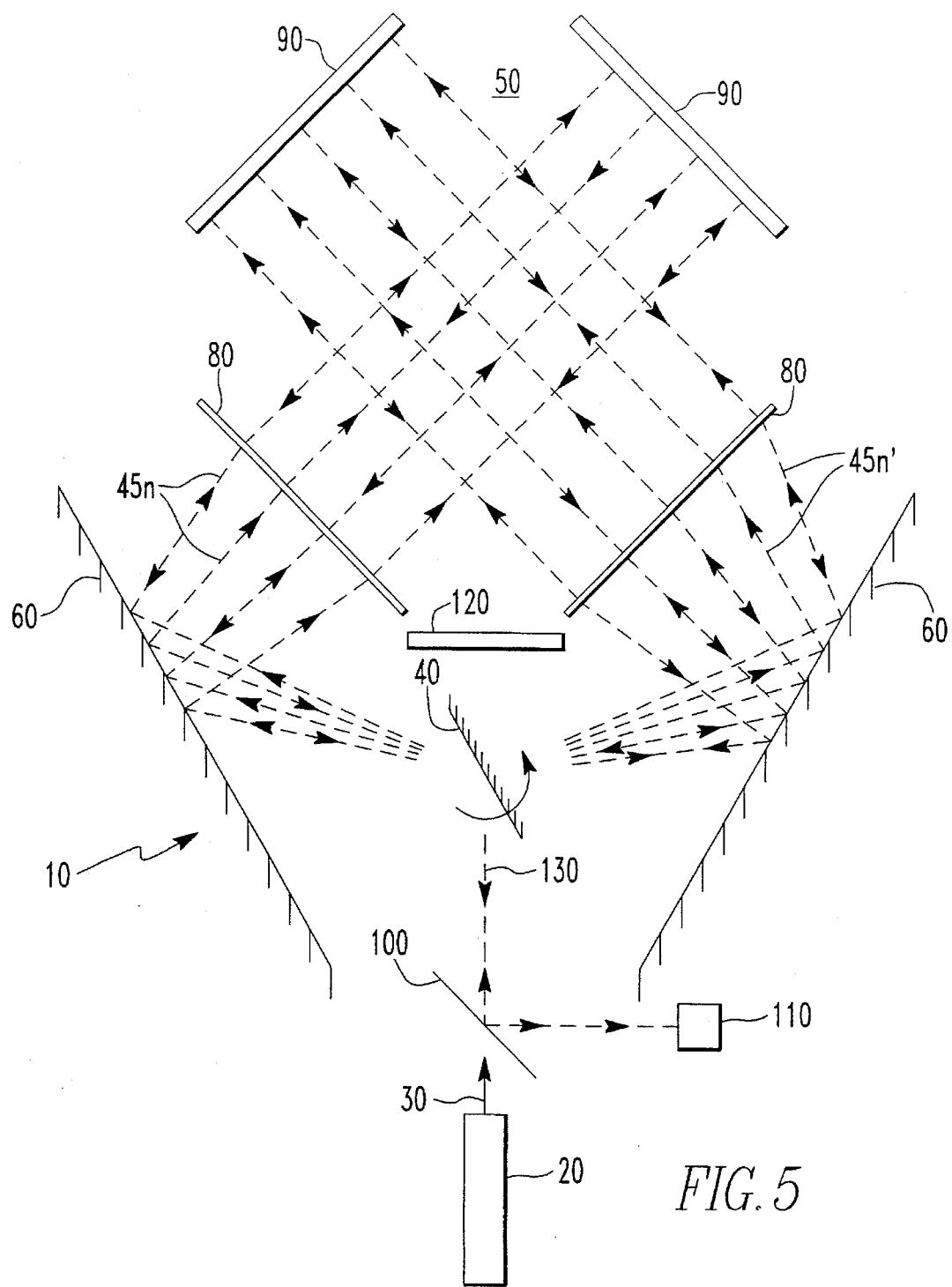
FIG. 5. is a schematic drawing of another aspect of the invention.

With reference to FIG. 5, another embodiment of the invention will be described. In the embodiment shown in FIG. 5, the field being scanned is the surface of a dart board (not shown). The presence and location of darts is determined and an appropriate numerical value is assigned in a manner previously described. The numerical value may then be displayed by means that are well known.

A collimated light source 20 emits collimated beam 30 which is partially transmitted through beam splitter 100. The beam is reflected by a first reflective surface 40 and scanned through nearly a 360° arc to generate scanned beams 45n, n'.

Scanned beams 45n, n' are reflected by a pair of second reflective surfaces 60 and subsequently collimated by a pair of imaging lenses 80. Scanned beams 45n, n' overlap field 50 and are reflected by retroreflective surfaces 90 back along their original paths. The retroreflected beams converge and become beam 130, which is then partially reflected by beam splitter 100 onto detection means 110. In the embodiment of FIG. 5, there is also disclosed beam block 120 positioned to prevent stray beams from first reflective surface 40 from propagating into the field 50 and being detected.

Collimated light source 20 is preferably a laser diode radiating at about 780 nm and emitting a 1 mm diameter collimated beam. The laser diode may be purchased as indicated above.

First reflective surface 40 is preferably a planar, single facet rotating mirror which has a constant spin of approximately 1800 rpm and which may be purchased from Nidec. The mirror may be powered by a 12 V DC motor.

Lenses 80 are preferably positive Fresnel lenses and are preferably positioned orthogonal to one another and define the field 50 to be overlapped by scanned beams 45n, n'. In the present embodiment, the Fresnel lenses have a focal length of approximately 22 inches and an aperture size of approximately 18 inches. These Fresnel lenses may be purchased from 3M.

Second reflective surfaces 60 may be commercial, planar mirrors which have a width commensurate with the size of field 50. The mirrors and the rotating mirror are preferably positioned such that the rotating mirror is at the focal point of both Fresnel lenses.

Scanned beams 45n, n', after being collimated by the Fresnel lenses, propagate orthogonal to one another and create a rectangular coordinate system over field 50 as shown in FIG. 5.

Beam splitter 100 is preferably a 50% transmittive/reflective beam splitter purchased from Edmund Scientific.

Retroreflective surfaces 90 are preferably retroreflective tape having a granularity of less than 1 mm and may be purchased from Reflexite Corp. Detection means 110 preferably is a silicon photo diode, small area detector having a surface area of 0.5 mm$^2$ and may be purchased from Thorlabs, Inc.

Beam block 120 may be any type of nontransparent, nonreflective material positioned such that stray beams are prevented from entering the field and being detected.

The optical system described and illustrated in FIG. 5 may be used to accurately detect the presence and location of darts thrown at a dart board, in a manner previously described. The location of the darts may then be correlated to a numerical value, i.e., a score and the score electronically displayed to the dart player(s).

In the specific case of a dart board, the field established by the optics must be as large or larger than the dart board surface. Scanned beams 45n, n' are adjusted so that they are approximately 1–2 mm above the planar surface of the dart board. It is particularly important in darts for the scanned beams to scan as close as possible the surface to be scanned to accurately determine the location of the dart tip—which location determines the score.

It may be necessary to embed the spider of the dart board in the dart board to obtain the desired accuracy. The spider typically sits on the surface of the dart board and may interfere with the beams accurately scanning the surface to give false readings.

In a preferred embodiment, a calibration device is positioned in the field at a known location relative to the dart board to permit proper calibration of the board within the field and thereby ensure that accurate scores are determined.

When a dart is thrown into the dart board, scanned beams 45n, n' are blocked over the width of the dart point being scanned, which results in a decrease in the intensity of the signal. The detector senses the decrease and the combination of information from the rotating mirror and detector correlates the position of the dart to the time/intensity output of the detector. The x-y coordinate of the dart is then determined from the decrease in signal from scanned beams 45n, n'. The x-y coordinate is then transformed to a score based on the location of the dart in the board. When a second, third, or fourth dart is thrown, subsequent decreases in signals are detected and correlated as above.

In addition to the above components, in a particularly preferred embodiment of the system where a dart board is placed in the field, there is included a transducer on the back of the dart board to sense when a dart hits the board. If the dart sticks into the board, the scanning system detects its location and gives a score. If, on the other hand, the dart hits the board but does not stick, the system will acknowledge that a dart was thrown but will not detect the presence or location of a dart and will assign no score.

It will be apparent to those skilled in the art that modifications and variations can be made in the optical system of the present invention without departing from the spirit or scope of the invention. Thus, it is intended that the present invention cover the modifications and variations of this invention provided they come within the scope of the appended claims and their equivalents.

I claim:

1. An optical system having minimum shadowing effects for detecting the presence and location of multiple objects in a field comprising:

(i) at least one light source to generate a beam;

(ii) at least one first reflecting surface to generate a plurality of beams;

(iii) at least one second reflecting surface to cause said beams to overlap said field;

(iv) imaging optics for imaging at least a portion of said beams prior to overlapping said field comprising two Fresnel lenses positioned orthogonal to one another, wherein said imaging optics are located between said second reflecting surface and said field; and (v) at least one detection means for detecting the intensity of said beams.

2. The optical system of claim 1 further comprising a retroreflector to reflect said beams along their original paths.

3. The optical system of claim 1 wherein said light source comprises a collimated light source.

4. The optical system of claim 1 wherein said first reflecting surface comprises a rotating mirror.

5. The optical system of claim 4 wherein said first reflecting surface rotates at a constant speed.

6. The optical system of claim 1 further comprising a retroreflector and a beam splitter.

7. The optical system of claim 1 further comprising means for analyzing the detected intensity of said beams to determine each object's location in said field.

8. An optical system having minimum shadowing effects for detecting the presence and location of multiple objects in a field comprising:

(i) a light source to generate a beam;

(ii) a first reflecting surface to generate a plurality of beams;

(iii) second reflecting surfaces to cause said beams to overlap said field;

(iv) imaging optics to collimate said beams prior to overlapping the field comprising two orthogonally positioned Fresnel lenses, wherein said imaging optics are located between said second reflecting surfaces and said field; and (v) detection means for detecting the intensity of said beams.

9. The optical system of claim 8 further comprising retroreflectors positioned on a side of said field away from said second reflecting surfaces to reflect said beams along their original paths.

10. The optical system of claim 9 further comprising a beam splitter to direct said beams reflected along their original paths onto said detection means.

11. The optical system of claim 8 wherein said light source comprises a collimated light source and said first reflecting surface comprises a rotating mirror having a planar surface, causing said beams to scan a two-dimensional field.

12. The optical system of claim 11 wherein said two-dimensional field being scanned comprises a dart board surface.

13. The optical system of claim 11 further comprising means for analyzing the detected intensity of said beams to determine an object's location in said field.

14. A method for detecting the presence and location of multiple objects in a field and having minimum shadowing effects comprising the steps of:

(i) generating at least one beam;

(ii) reflecting said beam to generate a plurality of beams with at least one first reflective surface;

(iii) causing at least a portion of said beams to overlap said field with at least one second reflective surface;

(iv) imaging said beams prior to overlapping the field with two orthogonally positioned Fresnel lenses; and (v) measuring the intensity of said beams after they overlap said field with at least one detection means.

15. The method of claim 14 further comprising the step of reflecting said beams along their original paths after overlapping the field and prior to measuring their intensity.

16. The method of claim 14 wherein said beam is generated by a collimated light source.

17. The method of claim 14 wherein said first reflecting surface is a rotating mirror having a planar reflecting surface capable of scanning a two-dimensional field.

18. The method of claim 14 further comprising the step of analyzing the measured intensity of said beams to determine each object's location in said field.

* * * * *